(12) United States Patent
Miyamoto et al.

(10) Patent No.: US 11,210,530 B2
(45) Date of Patent: Dec. 28, 2021

(54) SEMICONDUCTOR DEVICE, MOBILE APPARATUS, AND METHOD OF CONTROLLING MOBILE APPARATUS

(71) Applicant: RENESAS ELECTRONICS CORPORATION, Tokyo (JP)

(72) Inventors: Remi Miyamoto, Tokyo (JP); Keisuke Matsumoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/848,667

(22) Filed: Apr. 14, 2020

(65) Prior Publication Data

US 2020/0387717 A1  Dec. 10, 2020

(30) Foreign Application Priority Data

Jun. 6, 2019  (JP) .............................. JP2019-106284

(51) Int. Cl.
*G06K 9/00* (2006.01)

(52) U.S. Cl.
CPC ................................ *G06K 9/00771* (2013.01)

(58) Field of Classification Search
CPC . G06K 9/6271; G06K 9/00771; G06K 9/4604
See application file for complete search history.

(56) References Cited

U.S. PATENT DOCUMENTS

| 2008/0055413 | A1* | 3/2008 | Hayashi | H04N 13/221 |
| | | | | 348/169 |
| 2012/0189287 | A1* | 7/2012 | Otani | H04N 5/772 |
| | | | | 386/343 |
| 2018/0114075 | A1* | 4/2018 | Hattori | G06T 7/70 |
| 2020/0143544 | A1* | 5/2020 | Yamada | G06T 7/20 |
| 2020/0364443 | A1* | 11/2020 | Chen | G06T 7/246 |

FOREIGN PATENT DOCUMENTS

JP          5771885 B2     9/2015

* cited by examiner

*Primary Examiner* — Syed Haider
(74) *Attorney, Agent, or Firm* — McDermott Will & Emery LLP

(57) ABSTRACT

A semiconductor device for an apparatus having a movement drive unit and an image unit, includes an image detection unit, an image recognition unit and control unit. The image detection unit detects an object in a captured image and cuts out an image area including the object from the captured image as an object detection area image. The image recognition unit performs an image recognition processing for the object detection image area and output a recognition probability of the object. The control unit controls at least one of a moving speed of the movement drive unit and an imaging interval of the image unit based on the recognition probability.

12 Claims, 16 Drawing Sheets

FIRST OBJECT DETECTION

SECOND OBJECT DETECTION

SEMICONDUCTOR DEVICE, MOBILE APPARATUS, AND METHOD OF CONTROLLING MOBILE APPARATUS

CROSS-REFERENCE TO RELATED APPLICATIONS

The disclosure of Japanese Patent Application No. 2019-106284 filed on Jun. 6, 2019 including the specification, drawings and abstract is incorporated herein by reference in its entirety.

BACKGROUND

The present disclosure relates to a semiconductor device, for example, the present disclosure can be suitably applied to a semiconductor device for performing image processing and a mobile apparatus including the semiconductor device.

In recent years, a mobile apparatus equipped with camera such as self-propelled electric cleaner and surveillance drones has become popular. A mobile apparatus equipped with camera may detect or recognize objects, persons, and the like from captured images in order to control the mobile apparatus.

For example, Japanese Patent No. 5771885 (Patent Document 1) discloses an electric cleaner device with camera. The electric cleaner in Patent Document 1 performs image recognition by comparing a captured image captured by camera with an image of a foreign object stored in a storage unit, and recognizes the foreign object. In addition, when the electric cleaner recognizes a foreign object, the electric cleaner shows information for specifying what the recognized foreign object is on a display screen provided in the electric cleaner.

SUMMARY

In image recognition, in order to improve image recognition accuracy, it is considered that image recognition processing is performed using a captured image taken by a camera having a high resolution, or a number of captured images to be subjected to image recognition processing are increased. However, the image recognition processing increases due to an increase in the number of captured images or a captured image having a high resolution. As a result, the processing load of the processing unit for image recognition processing, for example, CPU (Central Processor Unit), may increase, and the power consumption may increase.

An object of the present invention is to improve image recognition accuracy without excessively increasing the processing load of image recognition processing. Other problems and novel features will become apparent from the description of the specification and drawings.

A semiconductor device according to one embodiment includes an image detection unit that detects an object in a captured image and cuts out an image area where the object exists from the captured image as an object detection area image, an image recognition unit that performs image recognition processing for the object detection area image and outputs a recognition probability for the object and a control unit that control at least one of a moving speed and an imaging interval based on the recognition probability.

A mobile apparatus according to another embodiment includes an imaging unit that captures an image, a movement drive unit that moves the mobile apparatus, an image detection unit that detects an object included in the captured image and cuts out an object detection area image in which the object is present, an image recognition unit that performs an image recognition processing for the object detection area image and outputs a recognition probability for the object, and a control unit that controls at least one of the movement drive unit and the imaging unit based on the recognition probability.

Further, according to the other embodiment, the control method of the mobile apparatus includes a step of capturing image obtained from an imaging unit, a step of detecting an object included in the captured image to cut out an object detection area image in which the object exists, a step of executing an image recognition process for the object detection area image to output a recognition probability for the object, and a step of controlling at least one of a moving speed and an imaging interval of the mobile apparatus in accordance with the recognition probability.

According to the present embodiments, it is possible to improve the image recognition accuracy without excessively increasing the number of captured images.

DETAILED DESCRIPTION

Figure 1:
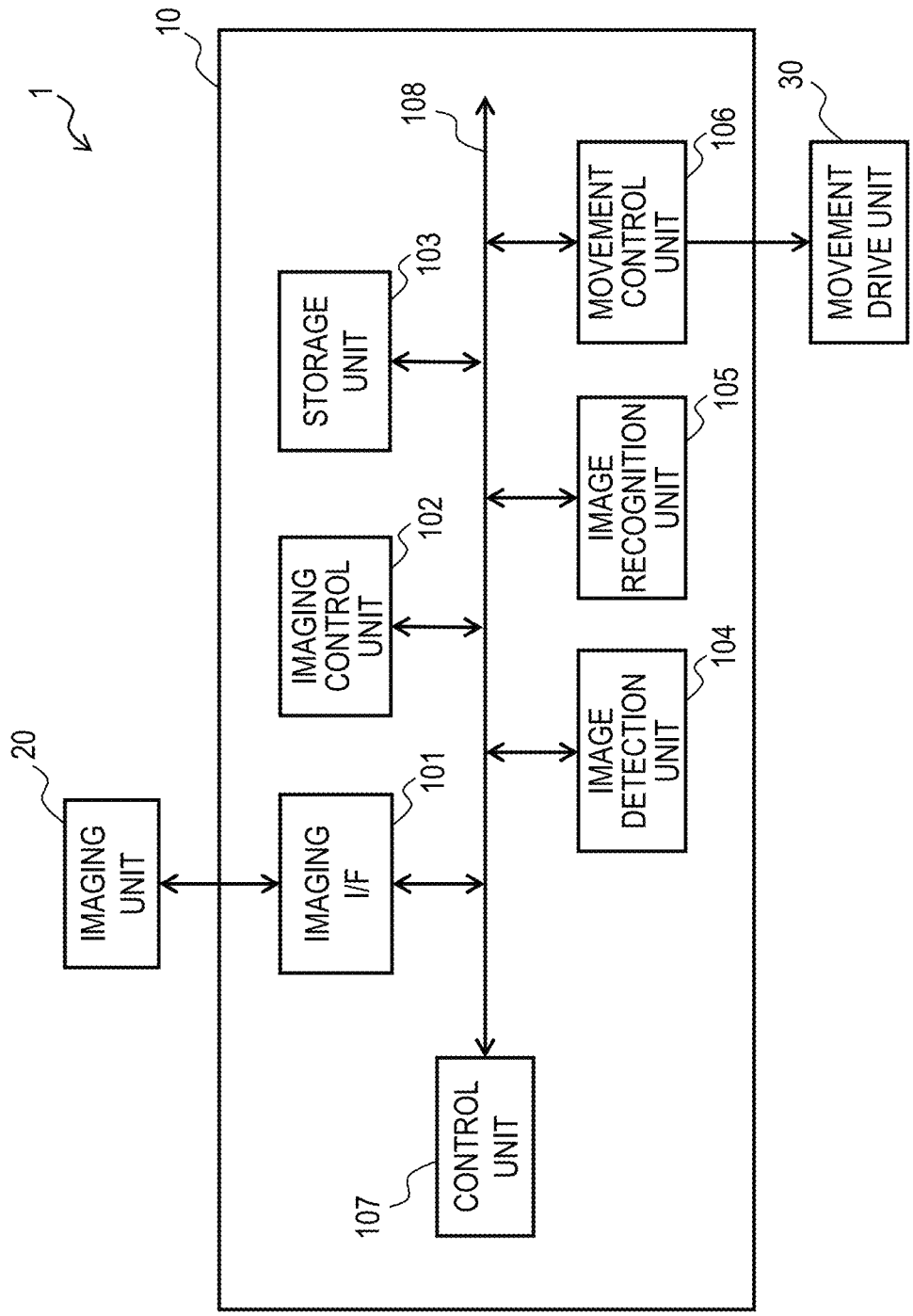
FIG. 1 is a block diagram showing the configuration of a mobile apparatus according to a first embodiment.

Hereinafter, a semiconductor device according to an embodiment will be described in detail by referring to the drawings. In the specification and the drawings, the same or corresponding components are denoted by the same reference numerals, and a repetitive description thereof is omitted. In the drawings, for convenience of description, the configuration may be omitted or simplified. Also, at least some of the embodiments and each modification may be arbitrarily combined with each other.

First Embodiment

FIG. 1 is a block diagram showing the configuration of a mobile apparatus according to first embodiment. As shown in FIG. 1, the mobile apparatus 1 includes a semiconductor device 10, an imaging unit 20, and a movement drive unit 30.

The imaging unit 20 includes, for example, CCD (Charge Coupled Device) image pickup elements or CMOS (Complementary Metal Oxide Semiconductor) image pickup elements, and image pickup lenses, and is disposed on the front side of the housing of the mobile apparatus 1. Then, the imaging unit 20 captures an image of the periphery of the mobile apparatus, for example, a traveling surface forward in the traveling direction.

The movement drive unit 30 includes a moving motor, a drive wheel, and the like (not shown), and moves the housing of the mobile apparatus 1 back and forward in the straight direction or moves the housing to left and right direction.

The semiconductor device 10 includes an imaging interface (I/F) 101, an imaging control unit 102, a storage unit 103, an image detection unit 104, an image recognition unit 105, a movement control unit 106, and a control unit 107, which are connected to each other via a system bus 108.

The imaging interface 101 is connected to the imaging unit 20, receives a captured image captured by the imaging unit 20, and temporarily stores the captured image in the storage unit 103. For example, the image size of the captured image is 640*480 pixels.

The imaging control unit 102 transmits an imaging control signal to the imaging unit 20 via the imaging interface 101. The imaging control signal is generated based on an imaging interval instruction from the control unit 107. The imaging unit 20 controls the imaging interval according to the imaging control signal, and sequentially transmits the captured images captured at the specified imaging interval. The imaging interval is defined as an acquisition interval of the captured image.

The storage unit 103 temporarily stores the captured image transmitted from the imaging unit 20 via the imaging interface 101, reads the temporarily stored captured image, and transmits the image to the image detection unit 104 for image detection. The storage unit 103 stores an image of an object detection area cut out when an object is detected by the image detection unit, as described later.

In the present embodiment, the captured image temporarily stored in the storage unit 103 is used for image detection processing in the image detection unit 104 and image recognition processing in the image recognition unit 105.

The image detection unit 104 reads the captured image temporarily stored in the storage unit 103, and searches for an area in which an object is displayed from the captured image. When there is an area in which an object is displayed, the image detection unit 104 cuts out the area in which the object is displayed, and stores the area image in the storage unit 103 as an object detection area image. For example, the image size of the object detection area image is 64*64 pixels.

The image detection unit 104 scans the target captured image with a determination area of a predetermined size, determines whether or not an object is present in the determination area, and stores the determination area determined to include the object in the storage unit 103 as an object detection area image. A well-known pattern recognition technique may be applied to determine whether or not an object is present in the determination area.

The image recognition unit 105 reads the object detection area image temporarily stored in the storage unit 103, and calculates the recognition probability for the object included in the object detection area image. That is, the image recognition unit 105 calculates the recognition probabilities of the plurality of recognition candidates for the object. Then, on the basis of the calculated recognition probabilities, what the object is specified. For example, the recognition candidate having the highest recognition probability is used as the recognition result of the object. As the recognition probability calculation method, a neural network such as a convolution neural network method is applied.

The movement control unit 106 controls the movement operation of the movement drive unit 30. For example, the movement control unit 106 includes a motor driver and the like, determines a movement direction and a moving speed based on a control signal from the control unit 107, and instructs the movement drive unit 30 to do so.

The control unit 107 instructs the imaging control unit 102 to capture at an imaging interval, which is an acquisition interval of image. In addition, the control unit 107 instructs the movement control unit 106 on the moving direction and the moving speed. Further, the control unit 107 controls at least one of the imaging control unit 102 and the movement control unit 106 based on the recognition probability output from the image recognition unit 105. Specifically, when the recognition probability output from the image recognition unit 105 is equal to or greater than a predetermined value, the control unit 107 sets the imaging interval and the initial value of the moving speed in the imaging control unit 102 and the movement control unit 106, respectively. On the other hand, when the recognition probability is less than the predetermined value, the control unit 107 controls the imaging control unit 102 and the movement control unit 106 so as to change at least one of the imaging interval and the moving speed. For example, when the recognition probability is less than a predetermined value, the control unit 107 controls the moving speed of the mobile apparatus 1 to be low or the imaging interval to be short.

Figure 2:
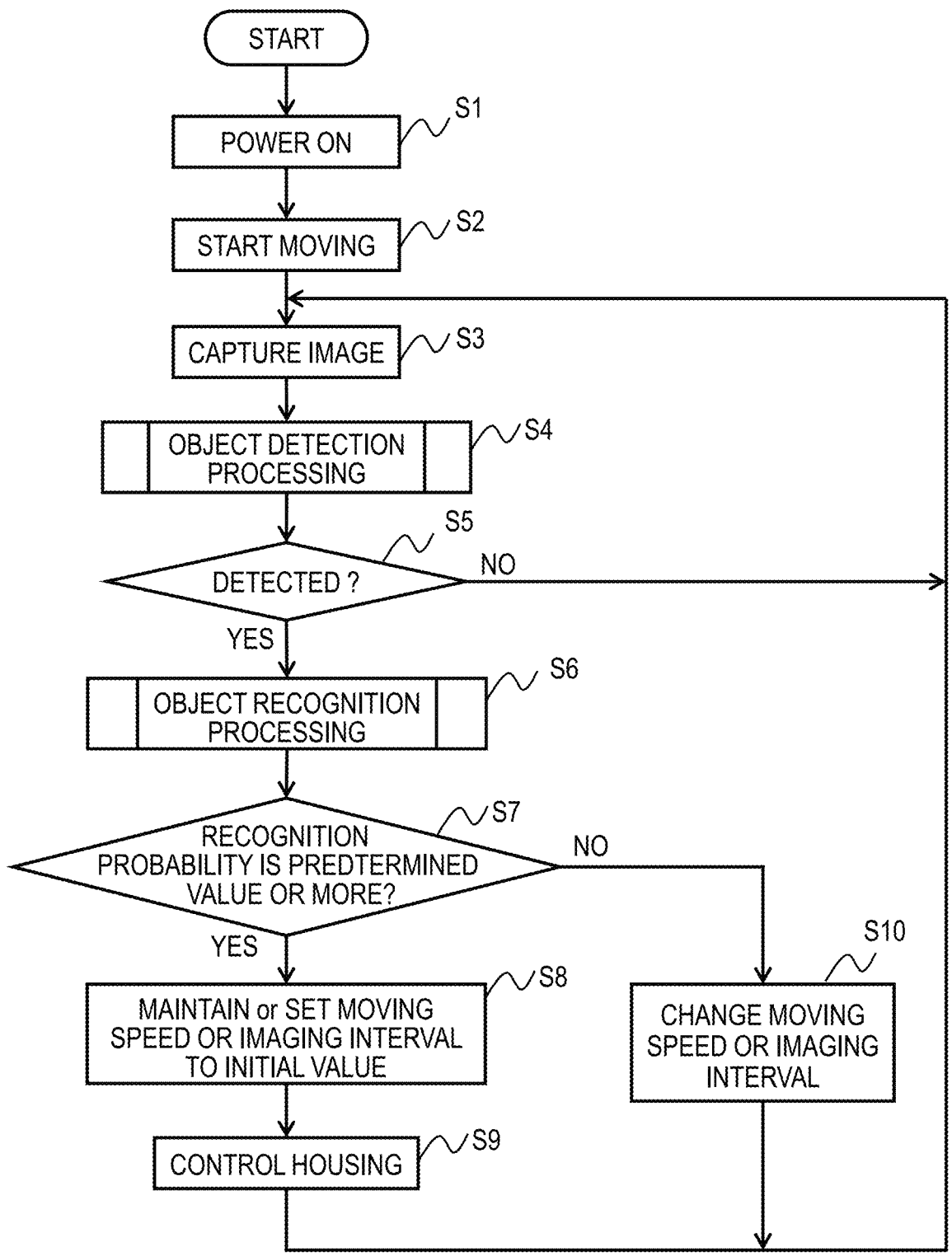
FIG. 2 is a flowchart illustrating an operation example of the mobile apparatus according to the first embodiment.
Figure 3:
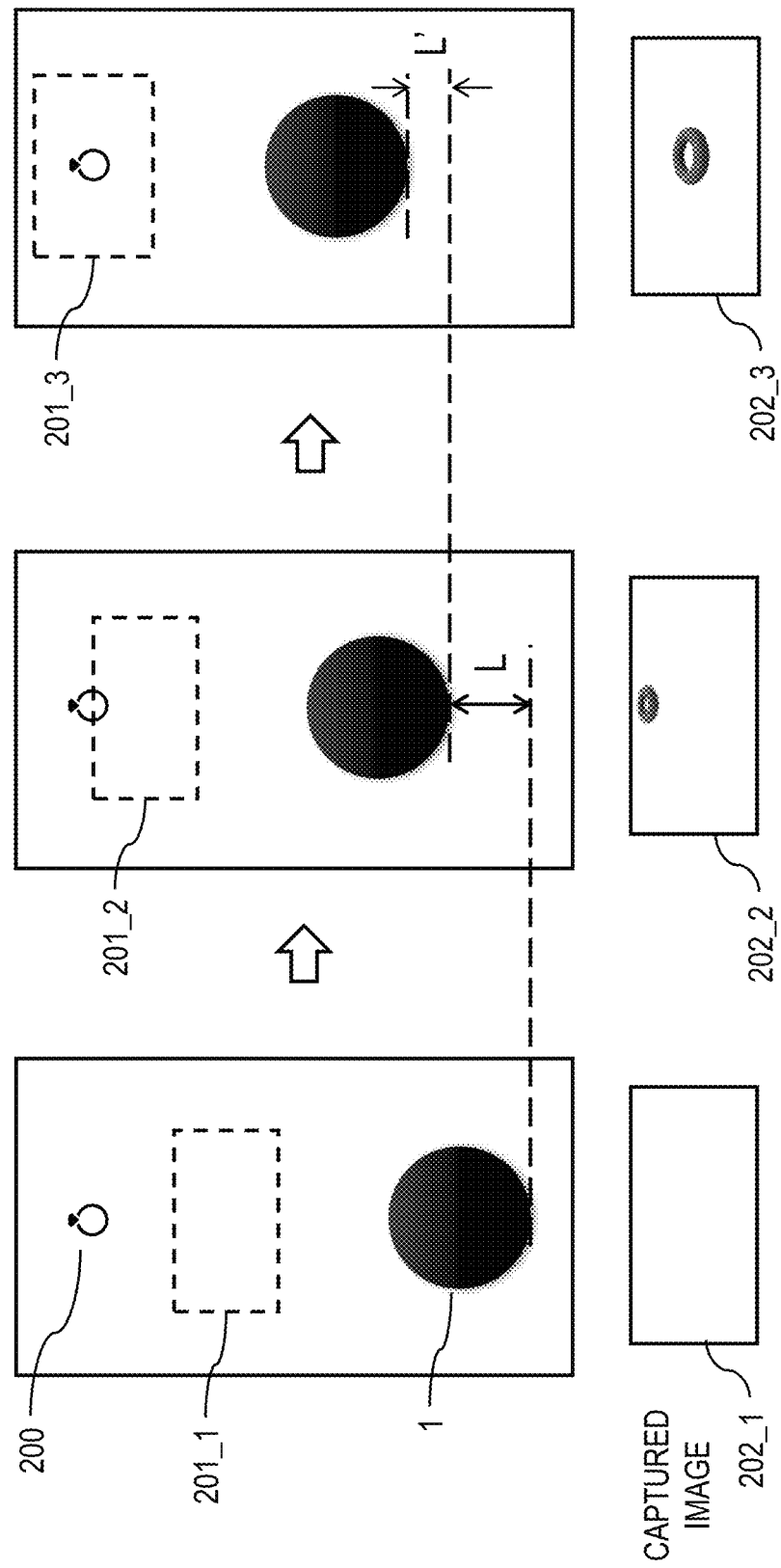
FIG. 3 is a diagram explaining the exemplary operation procedure of the mobile apparatus according to the first embodiment.

FIG. 2 is a flowchart showing an exemplary method of controlling the mobile apparatus 1 according to the first embodiment. FIG. 3 is an explanatory diagram showing the operation according to control of the mobile apparatus 1. In the center and the right side of FIG. 3, the reference numerals of the same elements as those in the left side of FIG. 3 are omitted.

First, the mobile apparatus 1 is powered on in step S1, and the initial value of imaging interval and the initial value of the moving speed are set in the imaging control unit 102 and the movement control unit 106, respectively. The initial value of the imaging interval and the initial value of the moving speed are predetermined by the designer. For example, the initial value of the imaging interval and the initial value of the moving speed are set so that the moving distance of the mobile apparatus 1 in the imaging interval is approximately equal to the image field length in the traveling direction, i.e., the length in the perpendicular direction of the captured image. The mobile apparatus 1 starts moving in accordance with the initial value of the moving speed (step S2) and starts capturing in accordance with the initial value of the imaging interval (step S3).

Next, the image detection unit 104, in order to determine whether an object is included in the captured image by the imaging unit 20, the object detection processing is executed for the captured image by the imaging unit 20 by the image detection unit 104 (step S4). As shown in the left side of FIG. 3, when an object is not reflected in the captured image 202_1, it is determined that an object is not reflected in the captured image because the object detection area image is not output (No in step S5), and the process returns to step S3. On the other hand, as shown in the center of FIG. 3, when an object appears in the captured image 202_2, since the object detection area image is output, it is determined that the object appears in the captured image (Yes in step S5), and the output object detection area image is stored in the storage unit 103.

In step S6, the image recognition unit 105 reads the object detection area image from the storage unit 103, performs image recognition processing on the read object detection area image, and outputs a plurality of recognition probabilities respectively corresponding to the plurality of recognition candidates.

When there is a recognition probability (e.g., 80% or more) of a predetermined value or more among the plurality of recognition probabilities (Yes in step S7), the control unit 107 maintains or resets the moving speed and the imaging interval to the initial values, respectively (step S8). Thereafter, in step S9, the control unit 107 controls the housing according to the recognition result of the object obtained from the recognition probability. For example, as will be described later, the moving directions may be controlled so as to avoid objects recognized by the mobile apparatus 1. That is, the control unit 107 may control the movement drive unit 106 so as to change the direction of movement of the self-apparatus, which is the mobile apparatus 1, when the recognition probability is equal to or greater than the predetermined value. Alternatively, the recognition result of the object may be notified by a notification unit (not shown). Thereafter, the mobile apparatus 1 returns to step S3, and repeats the image capturing, image detection process, and image recognition process based on the moving speed and imaging interval set in step S8.

On the other hand, when all of the recognition probabilities of the plurality of recognition candidates are less than the predetermined value (e.g., less than 80%) (No in step S7), the control unit 107 changes at least one of the moving speed and the imaging interval (step S10). That is, the control unit 107 may control the movement drive unit 106 so as to change the moving speed of the self-apparatus, which is the mobile apparatus 1, when the recognition probabilities are equal to or less than the predetermined recognition probability. When the recognition probabilities are equal to or less than the predetermined recognition probability, the control unit 107 may control the imaging control unit 102 so as to change the imaging interval of the self-apparatus, which is the mobile apparatus 1. As the reason why the recognition probability becomes less than the predetermined value, as shown in the center of FIG. 3, there may be a housing where the object 200 is included in the captured image 201_2 but only a part of the object appears in the captured image 202_2, or a housing where the object appearing in the captured image is small and a necessary feature amount cannot be obtained. Therefore, by controlling the moving speed or the imaging interval, the entire object is displayed on the captured image.

For example, in step S10, the control unit 107 sets the moving speed to be lower than the initial value of moving speed. Thereafter, the process returns to S3, and the mobile apparatus 1 captures images while moving at a lower speed than when the initial value of moving speed is set. That is, since the mobile apparatus 1 performs capturing images while decreasing the speed toward the object to be detected, it is possible to capture images of the entire object while preventing the object to be detected from falling outside the capturing range. In this manner, when only a part of the object is reflected as shown in the center of FIG. 3 and only the recognition probabilities less than a predetermined value is obtained, a captured image in which the entire object is reflected as shown in the right side of FIG. 3 can be obtained by the next capturing.

The object detection process is performed on the captured image in which the entire object obtained in this way is displayed, and the object detection area image is output (Yes in step S4 and step S5). In step S6, the image recognition processing is performed on the object detection area image. Since the entire object is included in the object detection area image, a recognition probability greater than the recognition probability in the captured image of the center of FIG. 3 can be expected.

When the recognition probability equal to or greater than the predetermined value is obtained, the control unit 107 returns the moving speed to the initial value of moving speed (step S8), and the control of the mobile apparatus 1 is performed based on the recognition result (step S9).

In step S10, the imaging interval may be shorter than the initial value of the imaging interval. Also, in this case, the same effect as in the housing where the moving speed is set to be lower than the initial value of the moving speed can be obtained. In other words, it is possible to obtain a captured image while gradually approaching the object, and as a result, it is possible to obtain a captured image in which the entire object is reflected.

Referring to FIG. 3, the operation of the mobile apparatus 1 will be described.

As shown in the left side of FIG. 3, when the object 200 is out of the captured image range, the object is not reflected in the captured image 201_1, as a matter of course. Therefore, the object is not detected (No in step S4), and the image acquisition is performed again while continuing the movement (step S3). As shown in the center of FIG. 3, when a part of the object 200 is reflected in the captured image range 201_2 at the next capturing timing, a captured image in which a part of the object is reflected is obtained, and the object is detected (Yes in step S5). Then, an image recognition processing is executed in step S6. However, since only a part of the object is reflected in the captured image, the recognition probability decreases. When the recognition probability is less than the predetermined value (No in step S7), the control unit 107 changes the moving speed to be lower than the initial value (step S10). That is, when the moving distance of the mobile apparatus 1 from the position of the mobile apparatus 1 shown in the left side of FIG. 3 to the subsequent capturing timing (the center of FIG. 3) is L, the moving distance L' from the position of the mobile apparatus 1 shown in the center of FIG. 3 to the position of the mobile apparatus 1 shown in the right side of FIG. 3 is smaller than the moving distance L. Therefore, the mobile apparatus 1 can move so that the captured image area 201_3 at the subsequent capturing timing does not exceed the position of the object, and as a result, the captured image 202_3 including the entire object can be obtained. Thereafter, an image recognition processing is performed on the captured image 202_3 including the entire object. When the recognition probability of being a ring is equal to or greater than a predetermined value (Yes in step S7), for example, the object is recognized as a ring. When the object is recognized, the moving speed of the mobile apparatus 1 is returned to its initial value (step S8), and then, for example, the direction is changed so as to avoid the object (step S9).

As described above, the mobile apparatus 1 according to the present embodiment controls the moving speed or the imaging interval based on the recognition probabilities after the image recognition process. When the recognition probability is low, the moving speed of the mobile apparatus 1 is made lower, or the imaging interval is made shorter, so that the image recognition processing is performed by increasing the number of captured images while approaching the object. The image recognition accuracy can be improved by increasing the number of captured images to be subjected to the image recognition processing. In other words, the number of captured images in a range closer to the object than the position at which the image recognition rate less than the predetermined value is obtained is increased, thereby improving the image recognition accuracy of the object. On the other hand, when a recognition probability equal to or greater than a predetermined value is obtained, the moving speed and the imaging interval of the mobile apparatus 1 are set to initial values, thereby suppressing the number of captured images in the moving area.

Further, since the image recognition processing is performed only on the object detection area image, the image recognition processing is not performed on the captured image in which the object is not reflected. Further, by cutting out an image of an area in which the object is detected from the captured image in which the object is detected, and making only the cut-out image an object of the image recognition processing, it is possible to suppress an increase in the image recognition processing. As a result, the image recognition processing time is shortened, and the processing can be performed with low consumption.

First Modified Example of First Embodiment

Figure 4:
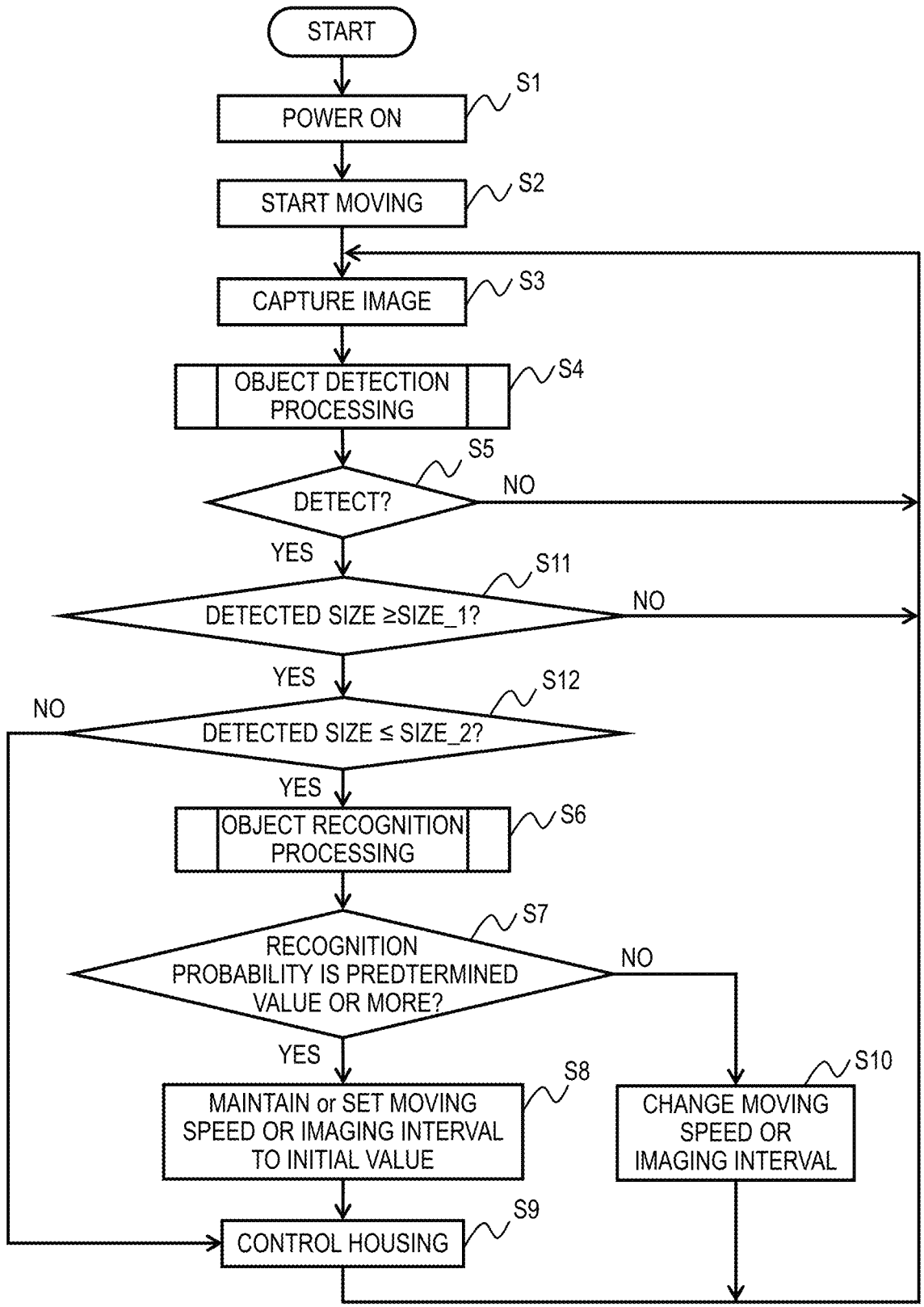
FIG. 4 is a diagram explaining an exemplary operation procedure of the mobile apparatus according to first modified example of the first embodiment.

Modified example of the first embodiment will be described referring to FIG. 4. FIG. 4 shows an exemplary controlling procedure of first modified example the mobile apparatus 1 according to first embodiment. In the explanation of first embodiment, the object detection is determined based on whether or not an object is reflected in the captured images (steps S4 and S5). In addition, it may be determined whether or not an object is detected according to the sizes of the object detection area (steps S11 and S12).

After the object is detected and the area in which the object is reflected is output, the image detection unit 104 determines whether or not the size of the object detection area image is larger than the first predetermined size (SIZE_1) (step S11). When the size of the object detection area image is equal to or larger than the first predetermined size (Yes in step S11), the process proceeds to step S12. On the other hand, when the size of the object detection area image does not exceed the size of the first predetermined size (SIZE_1) (No in step S11), the process returns to step S3. That is, when the size of the object detection area image is smaller than the first predetermined size, the object detection area image is not stored in the storage unit 103, and image recognition processing is not performed on the object detection area image.

When the size of the object detection area image is equal to or larger than the first predetermined size, it is further determined whether or not the size of the object detection area image is larger than the second predetermined size (SIZE_2) (step S12). When the size of the object detection area image is equal to or smaller than the second predetermined size (SIZE_2) (Yes in step S12), the image data of the area is stored in the storage unit 103, and image recognition processing is executed (step S5). On the other hand, when the size of the object detection area image is larger than the second predetermined size (No in step S12), the housing is controlled without performing the image recognition processing so as not to collide with the detected object (step S8).

As described above, according to first modified example, when the size of the object detection area image is within a predetermined size, the image recognition processing is performed on the object detection area image.

When the size of the object detection area image is small, the feature amount necessary for recognition cannot be obtained, and there is a possibility that only a low recognition probability can be obtained even if the image recognition processing is performed. Therefore, the image recognition processing is not performed on the captured image which is expected to obtain only the recognition result based on the low recognition probability. When the size of the object detection area image is large, there is a possibility that the housing collides with the object. Therefore, the housing control is prioritized so as to avoid collision without performing image recognition processing. Thus, by determining the execution of the image recognition processing according to the size of the object detection area image, the power consumption can be further reduced.

When the size of the object detection area image is equal to or larger than a predetermined size or smaller than a predetermined size, the image recognition processing may be performed on the object detection area image.

Second Modified Example of First Embodiment

Figure 5:
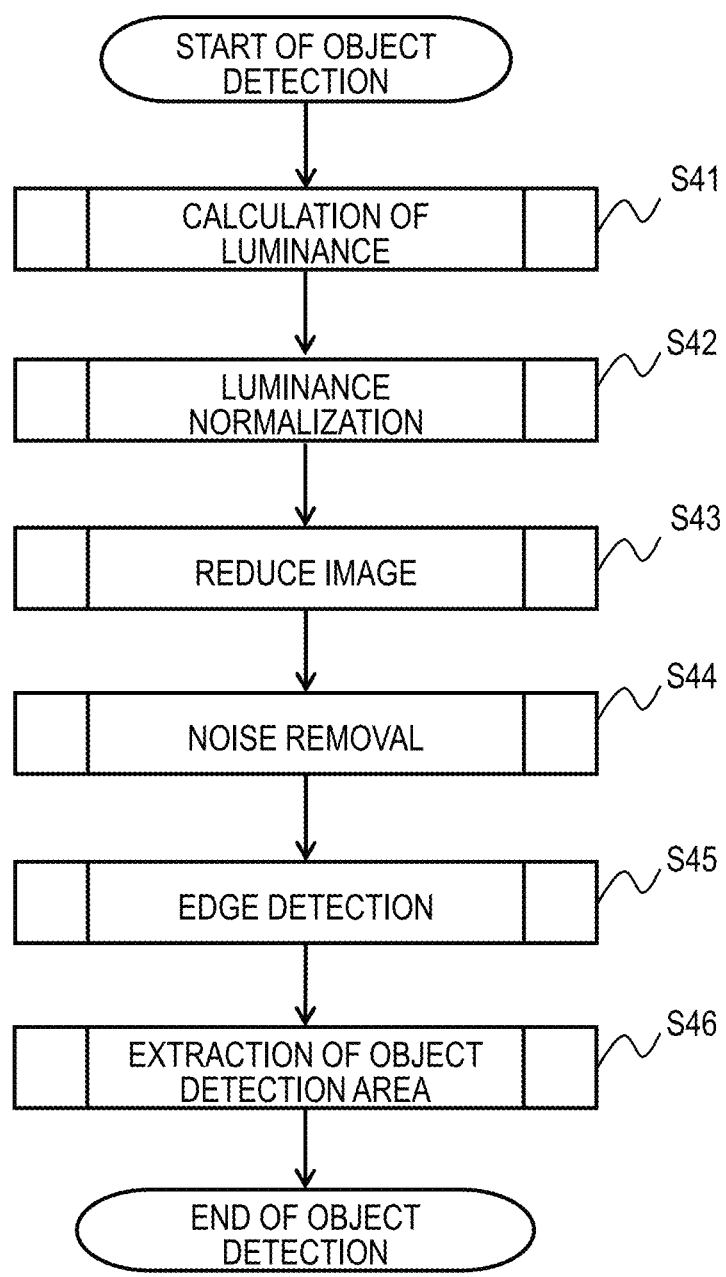
FIG. 5 is a flowchart showing an exemplary object detection process of the mobile apparatus according to second modified example of the first embodiment.

Another modified example of first embodiment will be described referring to FIG. 5. FIG. 5 is a flowchart showing an exemplary object detecting processing of mobile apparatus according to the second modified example of first embodiment.

First, in object detection processing according to the second modified example, in order to improve the detection accuracy of an object and prevent erroneous detection of an object due to noises, the image quality of a captured image is converted before object detection is performed.

The image detection unit 104 calculates the luminance of the captured image captured by the imaging unit 20 (step S41). Based on the calculated luminance, the exposure (shutter time, camera gain) of the imaging unit 20 is corrected. The calculation of the specific correction value and the control of the imaging unit 20 are executed by the control unit 107. Note that step S41 is a process for correcting the exposure of the imaging unit 20, and is not a process for the captured image itself.

Next, in step S42, the image detection unit 104 performs luminance normalization processing on the captured image. The exposure of the imaging unit 20 is corrected in step S41, and the luminance variation of the obtained captured image can be suppressed to some extent. By executing the luminance normalization processing on the captured image thus captured, it is possible to unify the luminance between captured images.

Next, the captured image subjected to the luminance normalization processing is converted into a grayscale image, and the grayscale image after the conversion is reduced in step S43. For example, the size of the reduced grayscale image is 320*240 pixels.

Next, noise removal is performed on the reduced grayscale images using noise removal filtering in step S44.

In operation S45, an edge detection process using the edge detection filtering is performed on the reduced grayscale image from which noise has been removed. As a result, a contour image of the object appearing in the captured image, i.e., an image after edge detection processing, is obtained. It should be noted that although the edge expansion processing is performed on the edge detection images to complement the cut contours, this edge expansion processing is not performed in the present second modified example.

Next, in step S46, object detection area extraction processing is performed. In the object detection area extraction processing, first, contour detection is performed on the image after the edge detection processing, and circumscribed rectangle information (including the position and size) of the detected contour is calculated. Then, the image detection unit 104 cuts out an image of an area corresponding to the circumscribed rectangle in the captured image using the calculated circumscribed rectangle information, and outputs the image as an object detection area image.

Thus, circumscribed rectangle information is calculated based on the reduced image, and the object detection area image is cut out from the captured image before reduction based on the calculated circumscribed rectangle information.

As described above, the image detection unit 104 performs contour detection on the edge detected image that has not been subjected to the edge expansion processing. By not performing the edge expansion processing, it is possible to prevent a contour of a small object which does not need to be a recognition target from being connected and erroneously detected as one large contour. While the contours of a plurality of objects are prevented from being connected to each other, there is a possibility that a large number of contours of various large and small objects are detected. Since there is a high possibility that the small contour is an object that does not need to be a recognition target, when the size of the circumscribed rectangle is equal to or smaller than a predetermined size (e.g., 32*32 pixels or smaller), the circumscribed rectangle information may not be used for cutting out the captured image.

When the edge expansion process is not performed, the contour of one object may be divided. However, a circumscribed rectangle based on a plurality of divided contours is likely to overlap. Therefore, when a part of a plurality of circumscribed rectangles overlap, the contour included in each of the plurality of circumscribed rectangles may be regarded as a contour of one object, circumscribed rectangle information of the connected circumscribed rectangle including the plurality of circumscribed rectangles may be generated, and an area corresponding to the connected rectangular portion of the captured image may be output as an object detection area image. When the size of the connected rectangular is equal to or larger than a predetermined size (e.g., 64*64 pixels or larger), a plurality of circumscribed rectangles may not be connected.

Further, when a plurality of circumscribed rectangles are obtained in the object detection area extraction processing, the priority may be calculated for each circumscribed rectangle. Then circumscribed rectangle information of a circumscribed rectangle having a high priority may be selected, and an object detection area image may be output based on the selected circumscribed rectangle information. For example, the priority may be calculated according to the ratio of pixels indicating the contour to the total pixels constituting the image data in the circumscribed rectangle. The contour of an object to be image recognition (e.g., a finger ring) is often a straight line or a smooth curve, but when noise is connected to form a contour, the contour is rarely a straight line or a smooth curve. Therefore, the ratio of the pixels indicating the contour to the total number of pixels in the circumscribed rectangle is smaller than that of the contour circumscribed rectangle of the object to be image-recognized, and is smaller than that of the contour circumscribed rectangle in which the noises are connected to each other. By using the ratio calculated in this manner as the priority, the circumscribed rectangle may be selected, and the object detection area image may be cut out from the captured image based on the circumscribed rectangle information of the circumscribed rectangle having a high priority.

According to the object detection processing in the second modified example, it is possible to prevent the detection accuracy from changing for each captured images by the exposure correction of the imaging unit 20 based on the luminance of the captured image and the luminance normalization processing on the captured image. In addition, since the data of each pixel is averaged and noise is reduced by reducing the captured image, erroneous detection can be reduced. In addition, by performing object detection processing using a reduced image, which is an image of low resolution, and cutting out an object detection area image from a captured image of high resolution based on the result, it is possible to improve image recognition accuracy while shortening the object detection processing time. Further, by acquiring circumscribed rectangle information of the contour without performing the expansion processing of the contour and selecting an appropriate circumscribed rectangle based on the size of the circumscribed rectangle, the concatenation of the circumscribed rectangles, and the priority of the circumscribed rectangle. Thus, it is possible to narrow down an object to be subjected to the image recognition processing, and as a result, it is possible to suppress an increase in the image recognition processing.

Specific Examples of Housing Control in Step S8

The mobile apparatus 1 is applicable to a self-propelled vacuum cleaner, an unmanned aerial vehicle for monitoring, various robotic devices equipped with cameras, and the like. A specific example of the housing control in step S8 will be described for each device.

Figure 6:
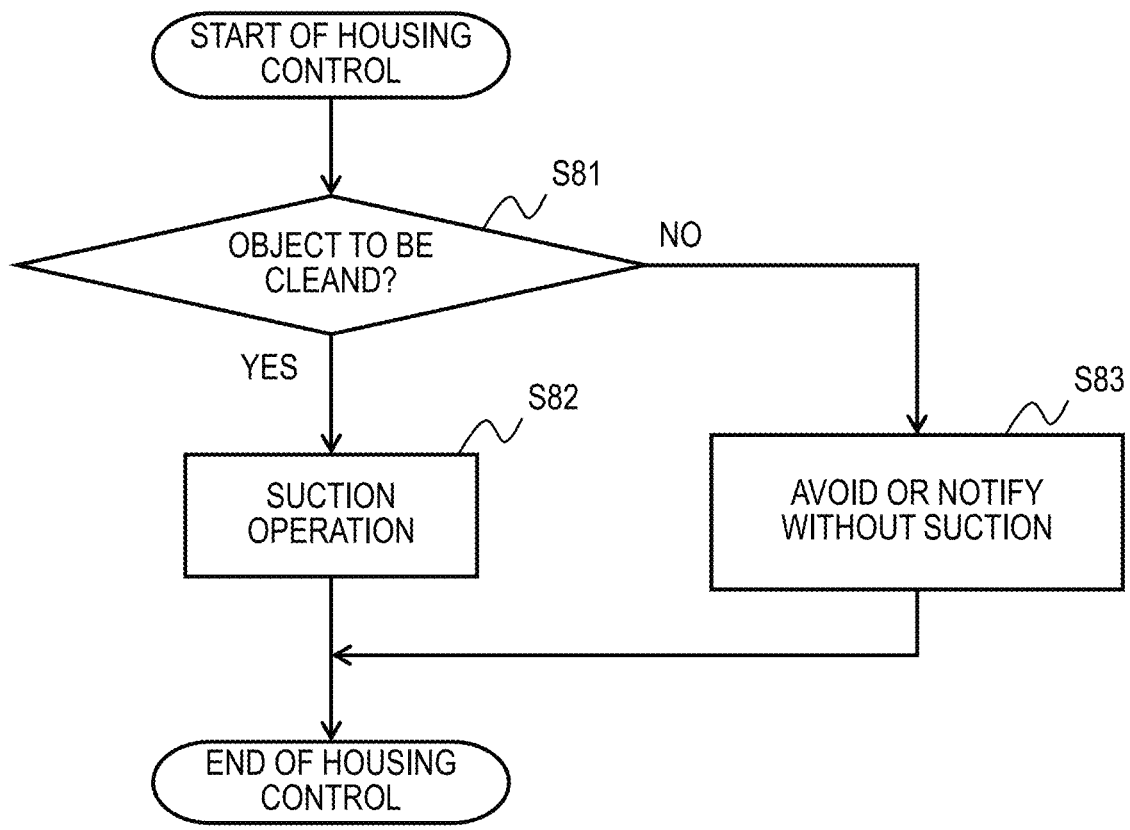
FIG. 6 is a flowchart showing an exemplary housing control operation of the mobile apparatus.

FIG. 6 is a diagram showing a housing control operation when the mobile apparatus 1 is a self-propelled cleaner. First, in operation S81, the mobile apparatus 1 determines whether or not the recognized result is an object to be cleaned. If the recognized object is an object to be cleaned, the suction operation is continued as it is in step S82. On the other hand, when the recognized object is not the object to be cleaned, the self-propelled cleaner stops the suction operation and moves the object while avoiding the object to avoid failure or breakage caused by sucking in foreign object which should not be sucked in originally, in step S83. Alternatively, the presence of an object may be notified by a notification unit (not shown).

Figure 7:
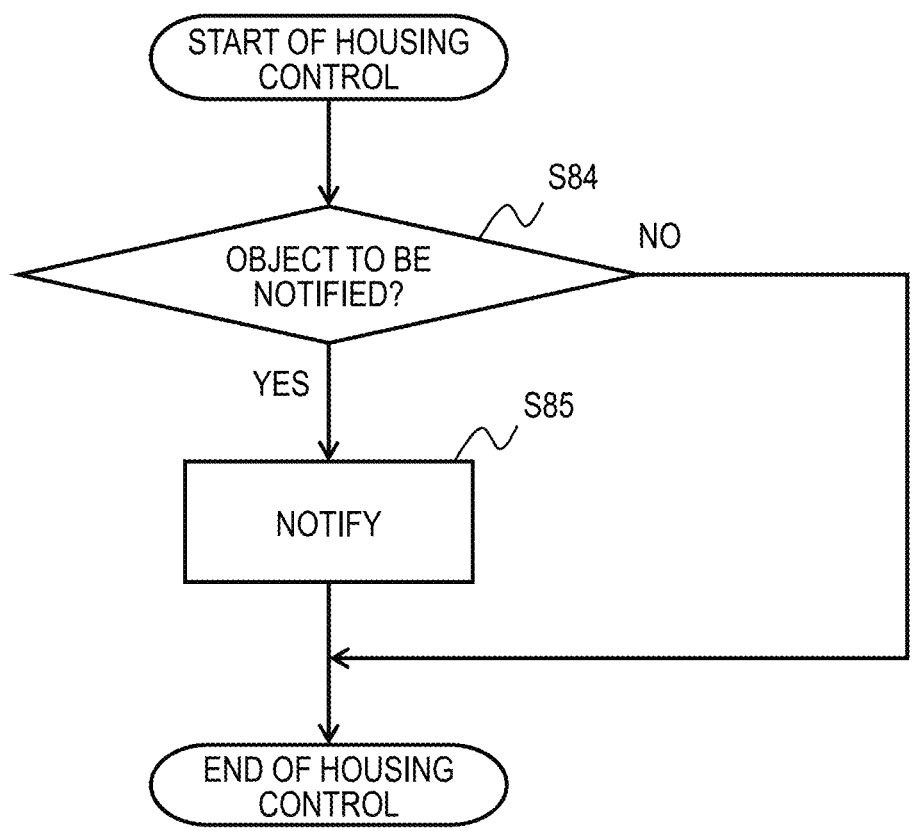
FIG. 7 is a flowchart showing another exemplary housing control operation of the mobile apparatus.

When the moving device 1 is an unmanned aerial vehicle for watching, as shown in FIG. 7, it is determined whether or not the recognized result is a notification object (for example, a person who has fallen) (step S84), and when it is a notification object, it is notified by a notification unit (not shown) (step S85).

Figure 8:
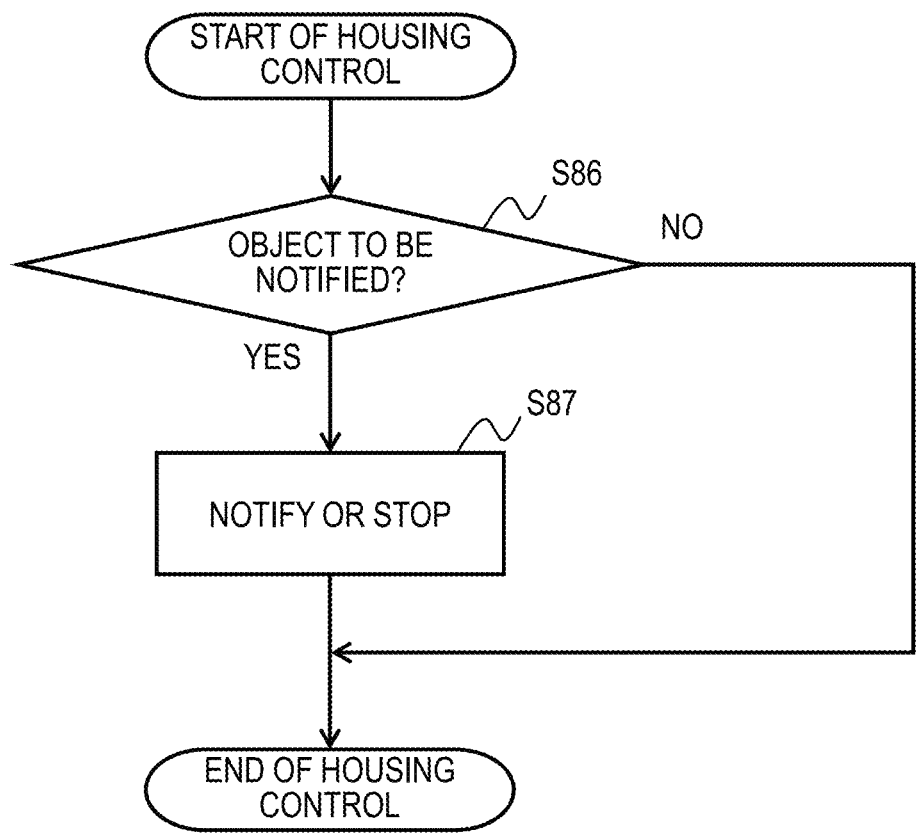
FIG. 8 is a flowchart showing another exemplary housing control operation of the mobile apparatus.

Further, when the mobile apparatus 1 is a robotic arm on which cameras are mounted, as shown in FIG. 8, it is determined whether or not the recognized object is a foreign object (step S86), and when it is a foreign object, it is notified by a notification unit (not shown) and its operation is stopped (step S87).

Second Embodiment

Figure 9:
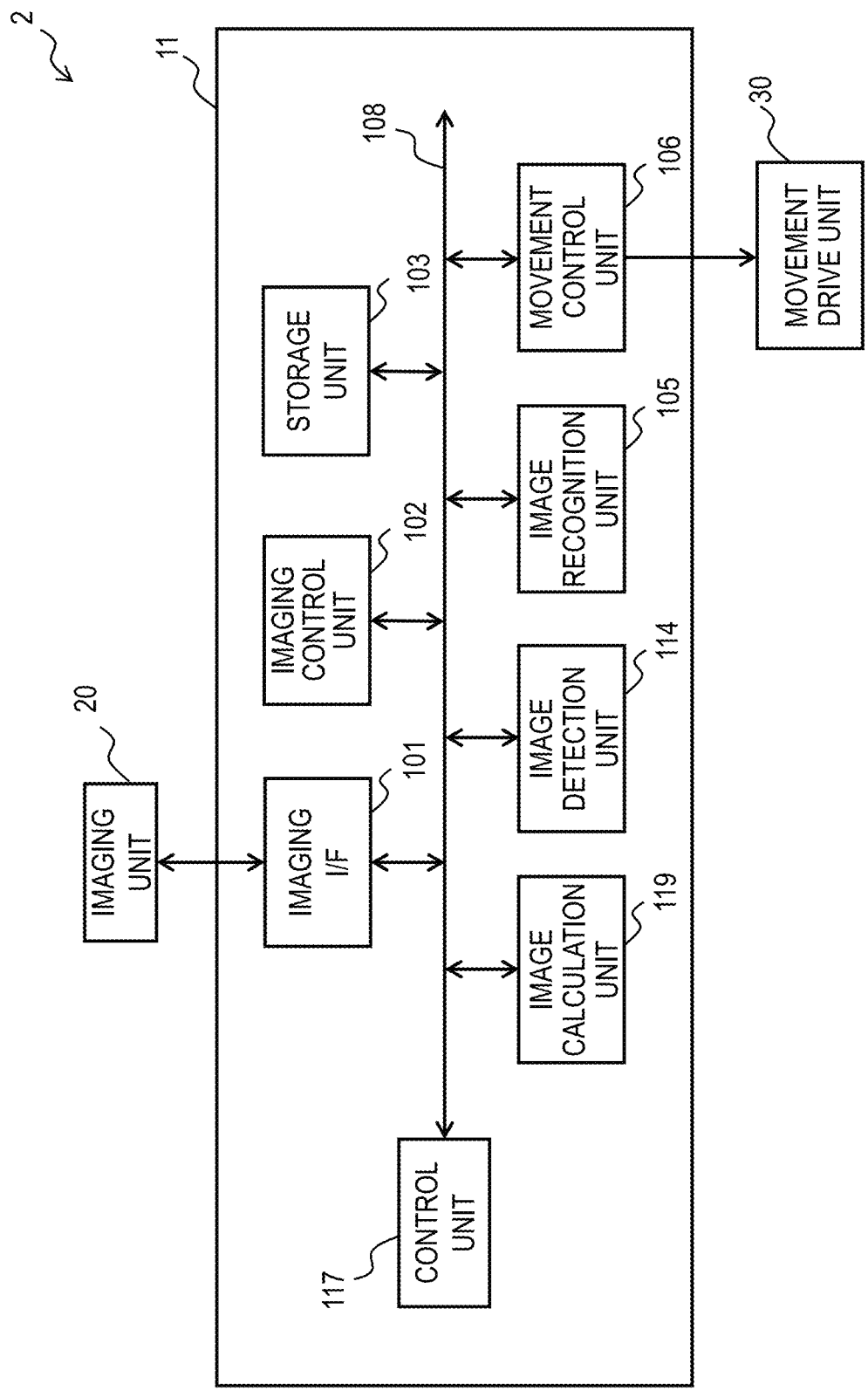
FIG. 9 is a block diagram showing the configuration of a mobile apparatus according to a second embodiment.

Next, a mobile apparatus 2 according to a second embodiment, which is another form of mobile unit device 1, will be described. FIG. 9 is a diagram showing an exemplary mobile apparatus 2, and the configuration other than semiconductor device 11 may be the same as that shown in FIG. 1. Therefore, their descriptions are omitted here. In the present embodiment, the components having the same functions as those in FIG. 1 are denoted by the same reference numerals, and descriptions thereof are omitted.

FIG. 9 is a block diagram showing the configuration of semiconductor device 11 according to the present embodiment. The configuration of semiconductor device 11 according to the present embodiment is the same as that of semiconductor device 10 according to first embodiment except for the image detection unit 114, the control unit 117, and the image calculation unit 119, and therefore, descriptions thereof are omitted.

As shown in FIG. 9, the image detection unit 114, the control unit 117, and the image calculation unit 119 are connected to the respective elements constituting semiconductor device 11 via the system bus 108.

Similar to first embodiment, the image detection unit 114 reads the first captured image temporarily stored in the storage unit 103, and searches for an area in which an object appears from the first captured image. When there is an area in which the first object is reflected, the image detection unit 114 cuts out the area in which the first object is reflected as the first object detection area, and stores it in the storage unit 103 as the first object detection area image. When there is an area in which an object is reflected, the image detection unit 114 calculates local coordinates of the contour of the object with respect to the captured image area, and stores the local coordinates in the storage unit 103.

Figure 10A:
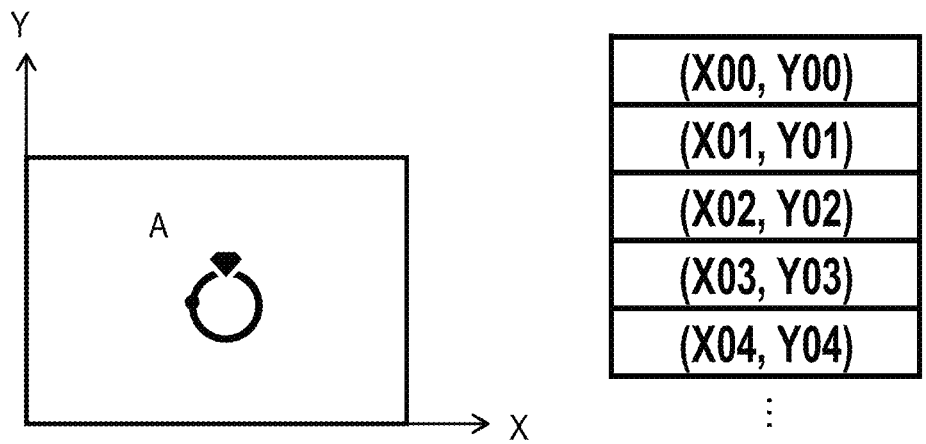
FIG. 10A is diagram illustrating an exemplary process of calculating the contour coordinates of the mobile apparatus according to the second embodiment.
Figure 10B:
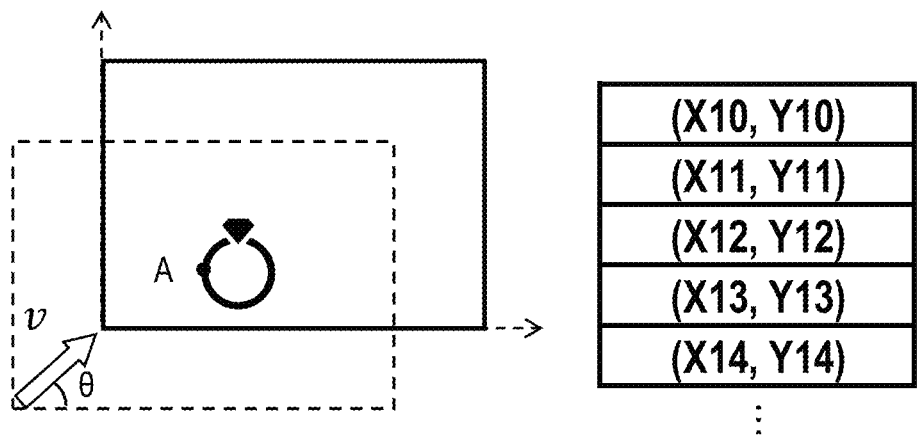
FIG. 10B is diagram illustrating an exemplary process of calculating the contour coordinates of the mobile apparatus according to the second embodiment.

The image calculation unit 119 reads the contour coordinates of the first object from the storage unit 103, and estimates the contour coordinates of the object detected in the next captured image using the moving directions, the moving speeds, and the imaging intervals set in the mobile apparatus 2. The estimated contour coordinates are stored in the storage unit 103. For example, if the coordinates of A point of the contour of the object in the captured image shown in FIG. 10A are (X0, Y0), the moving direction θ, the moving speed v, and the imaging distance Δt of the mobile apparatus 2, the coordinates (X1, Y1) of the A point of the contour of the object in the subsequent captured image shown in FIG. 10B can be estimated as follows.

$$X1 = X0 - v\Delta t^* \cos \theta \quad (1)$$

$$Y1 = Y0 - v\Delta t^* \sin \theta \quad (2)$$

Thus, estimated contour coordinates (X1, Y1) is stored in the storage unit 103.

The control unit 117 compares the contour coordinates of the second object detected in the second captured image captured this time with the estimated contour coordinates estimated from the contour coordinates of the first object in the first captured image captured previously. Then the control unit 117 determines whether or not the second object in the second captured image is the same object as the first object in the first captured image captured previously. More specifically, it is determined whether or not the estimated contour coordinates are included in the contour coordinates of the second object detected in the second captured image. When the estimated contour coordinates are included, it is determined that the first object and the second object are the same object. Then, in the present embodiment, when it is determined that an object in the continuously captured image is the same object, the control unit 117 compares the first recognition result obtained from the first recognition probability for the first object with the second recognition result obtained from the second recognition probability for the second object.

In addition, the control unit 117 controls at least one of the imaging control unit 102 and the movement control unit 106 based on the comparison result of the image recognition results with respect to the first and second captured images continuously captured. Specifically, when the image recognition results for the continuous captured images including the same object coincide with each other, the control unit 117 outputs the matching recognition result as the final recognition result, and instructs the imaging control unit 102 and the movement control unit 106 to return the imaging interval and the moving speed to the initial values. On the other hand, when the image recognition results of the consecutive captured images including the same object do not coincide with each other, it is considered that the object cannot be recognized, and at least one of the imaging control unit 102 and the movement control unit 106 is controlled in the same manner as first embodiment.

In this manner, by determining whether or not the object is the same and recognizing the object using a plurality of image recognition results for the same object, it is possible to improve the recognition accuracy of the object.

Figure 11:
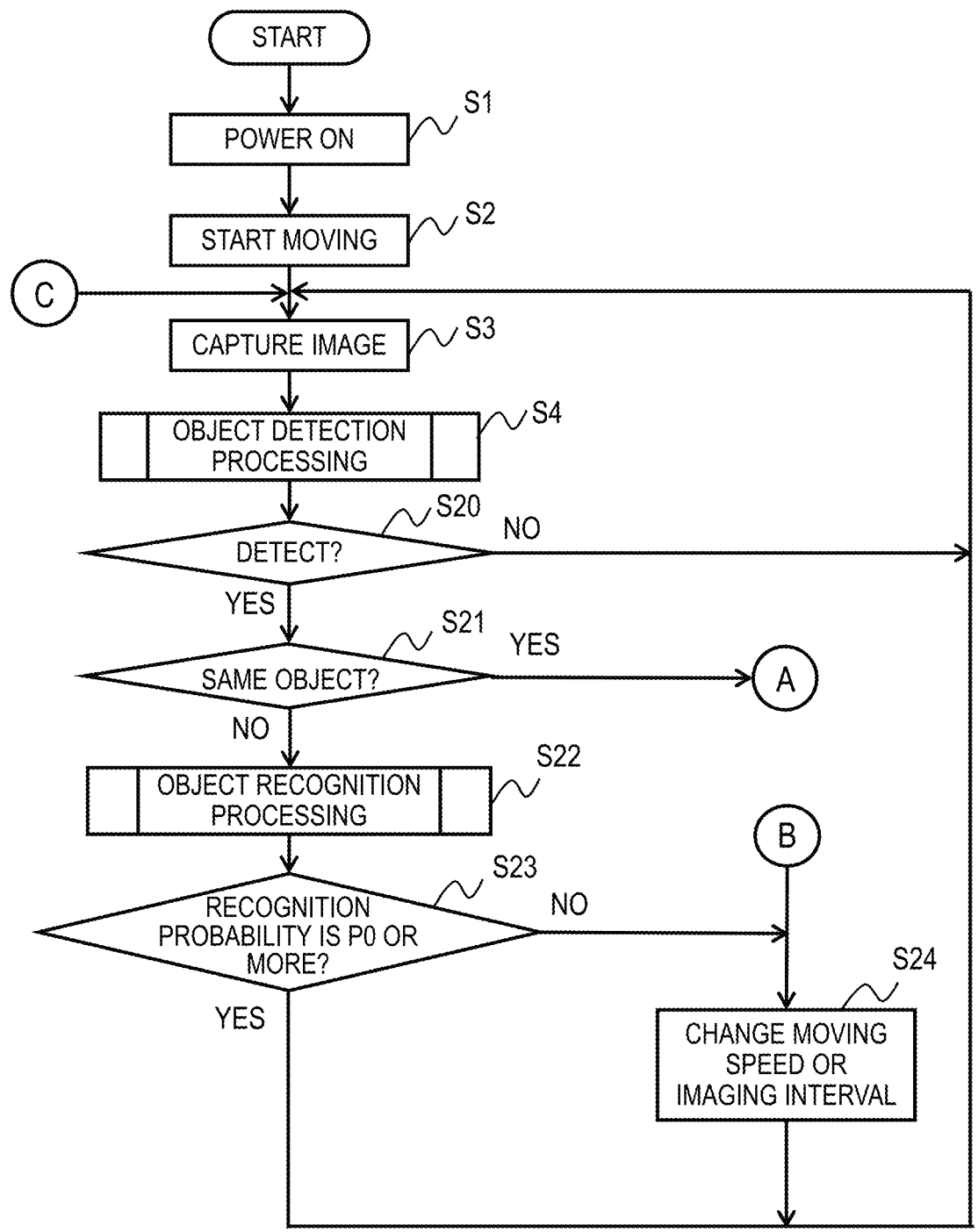
FIG. 11 is a part of a flowchart illustrating an exemplary operation of the mobile apparatus according to the second embodiment.
Figure 12:
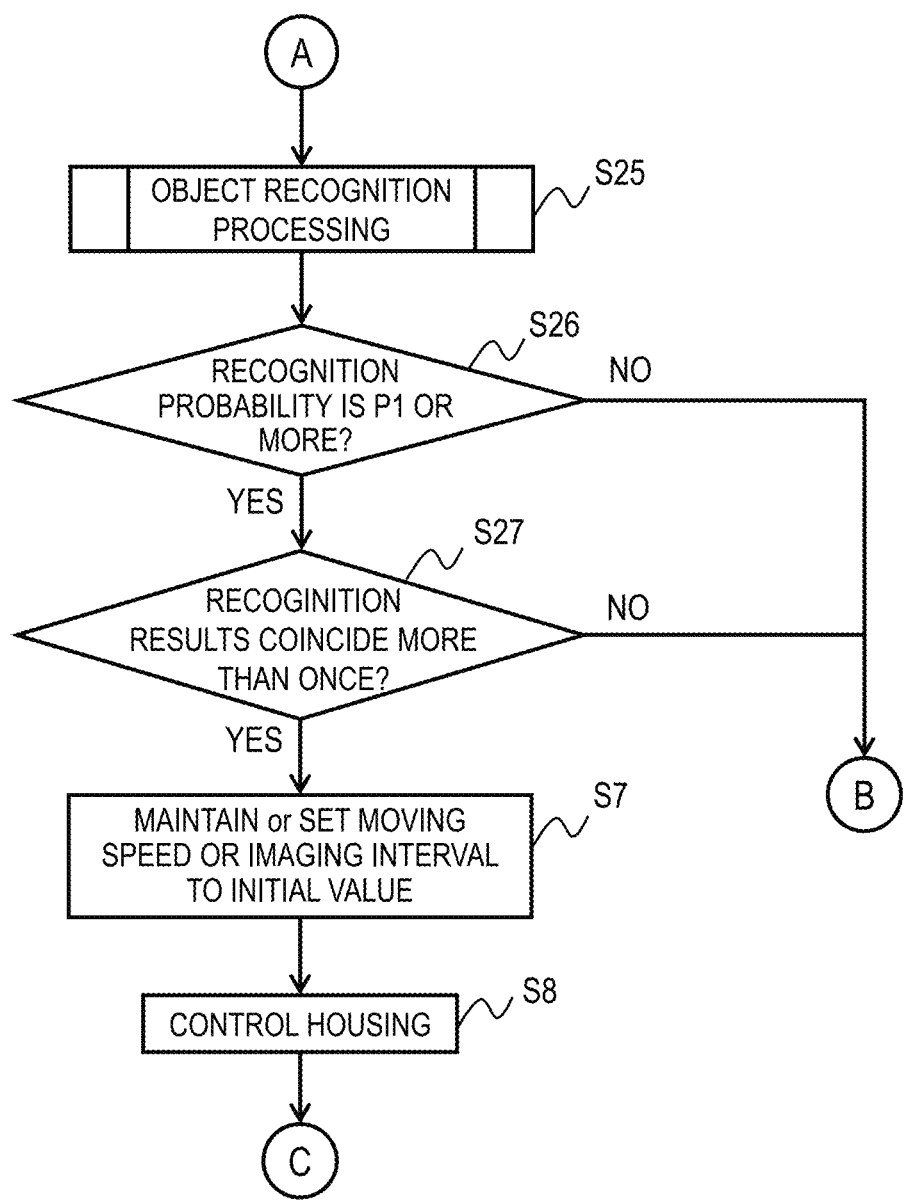
FIG. 12 is a part of a flowchart illustrating an exemplary operation of the mobile apparatus according to the second embodiment.
Figure 13:
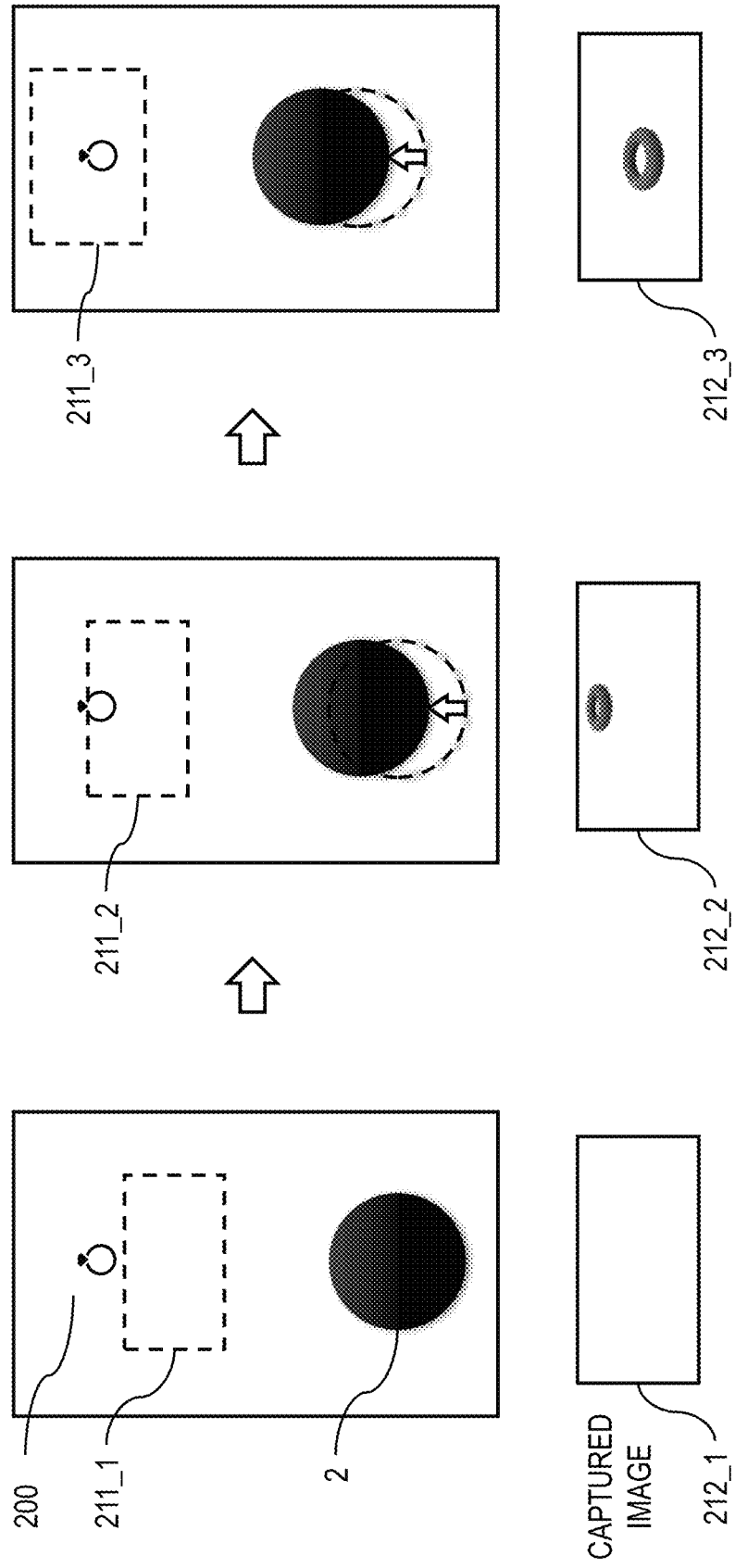
FIG. 13 is a diagram explaining an exemplary operation procedure of the mobile apparatus according to the second embodiment.

FIGS. 11 and 12 are flowcharts showing exemplary methods of controlling mobile apparatus 2 according to second embodiment. Hereinafter, according to operation of the mobile apparatus 2 will be described with reference to flowcharts. The same reference numerals are assigned to the same steps as in the operation of first embodiment mobile apparatus 1. FIG. 13 is an explanatory diagram showing a process sequence of the mobile apparatus 2. In the center and the right side of FIG. 13, reference numerals of portions common to those in the left side of FIG. 13 are omitted.

In step S1, the mobile apparatus 2 is powered on, and an initial value of the imaging interval and an initial value of the moving speed are set. The mobile apparatus 2 starts moving in accordance with the initial value of the moving speed (step S2) and performs capturing images in accordance with the initial value of the imaging intervals (step S3). Here, as the initial value of the moving speed and the initial value of the imaging interval, for example, the initial value of the image capturing interval and the initial value of the moving speed are set so that the moving distance of the mobile apparatus 2 in the image capturing interval is equal to or less than half of the image field length in the traveling direction, i.e., the length in the perpendicular direction of the captured image.

Next, in step S4, the image detection unit 114 executes object detection processing for determining whether or not an object is reflected in the captured image. As shown in the left side of FIG. 13, when the object is not included in the captured image range 211_1 and the object does not reflected in the captured image 212_1 (No in step S20), the process returns to step S3, and the movement and the capturing are continued. On the other hand, as shown in the center of FIG. 13, when the object enters the captured image range 211_2 and the object appears in the captured image 212_2 (Yes in step S20), the area in which the object appears is cut out from the captured image 212_2, and the contour coordinates of the object in the captured image are determined. Further, the image calculation unit 119 estimates the contour coordinates of the object detected in the next captured image from the contour coordinates.

Next, in step S21, the control unit 117 determines whether or not the object in the captured image is the same object as the object in the previous captured image, using the contour coordinates extracted from the current captured image and the estimated contour coordinates. Here, when the captured image 212_3 shown in the left side of FIG. 13 is a captured image obtained following the captured image 212_2 shown in the center of FIG. 13, the estimated contour coordinates of the object calculated based on the captured image 212_2 and the contour coordinates of the object calculated based on the captured image 212_3 are compared with each other, and it is determined whether or not they are the same object.

When it is determined that the object is not the same object (No in step S21), the object recognition processing is performed on the object detection area image cut out by the object detection unit 114, and recognition probabilities for a plurality of recognition candidates are output respectively (step S22). The output recognition probabilities are stored in the storage unit 103. If there is the recognition probability which is equal to or greater than the threshold P0 (Yes in step S23), the process returns to step S3, and the mobile apparatus 2 continues capturing while moving. If all of the recognition probabilities are smaller than the threshold P0 (NO in step S23), at least one of the moving speed and the imaging interval is changed (step S24), and the mobile apparatus 2 continues to move and capture in accordance with at least one of the changed moving speed and the imaging interval.

When it is determined in step S21 that the object is the same object (Yes in step S21), image recognition processing is performed on the object detection area image cut out by the object detection unit 114, and recognition probabilities for a plurality of recognition candidates are output (step S25). If there is the recognition probability which is equal to or greater than the threshold P1 (Yes in step S26), it is determined whether or not the recognition result obtained from the recognition probabilities based on the previous captured image stored in the storage unit 103 and the recognition result obtained from the current recognition probabilities indicate the same result (step S27). For example, it is determined whether the image recognition result obtained from the captured image shown in the center of FIG. 13 and the image recognition result obtained from the captured image shown in the right side of FIG. 13 indicate the same result.

When the recognition results obtained from a plurality of consecutive captured images coincide (Yes in step S27), the control unit 117 returns the moving speed and the imaging interval to the initial values (step S7), and after the housing is controlled based on the recognition result of the object (step S8), the control unit 117 returns to step S3 to continue to move and capture. It should be noted that the control of the mobile apparatus 2 in S8 may be the same as that of first embodiment, and therefore the explanation thereof is omitted.

If all of recognition probabilities are less than the threshold value P1 (No in step S26) or if a plurality of recognition results are inconsistent in step S27 (No in step S27), the process returns to step S24, and the control unit 117 changes at least one of the moving speed and the imaging interval. Then, the process returns to S3, and the mobile apparatus 2 continues to move and capture.

The recognition probability threshold P0 and the recognition probability threshold P1 may be the same value or different values. Generally, when the distances between the mobile apparatus 1 and the object are long, the feature quantity of the object cannot be sufficiently obtained, and the recognition probability tends to be low. Therefore, by making the recognition probability threshold P1 larger than the recognition probability threshold P0, it is possible to obtain a result with higher recognition accuracy.

What is obtained by the image recognition processing is only the recognition probability of the object, and there is a possibility that recognition is erroneous. However, the mobile apparatus 2 according to present embodiment determines whether or not objects reflected in a plurality of captured images are the same, and obtains a final recognition result from a plurality of recognition process results for the same object. That is, by recognizing the same object a plurality of times, it is possible to obtain a recognition result with high accuracy.

In present embodiment, the object is recognized using the image recognition results from the two captured images, but the final recognition result may be determined by prioritizing the recognition result later. Further, the initial value of the moving speed and the initial value of the imaging interval may be appropriately set, and the object may be recognized using the image recognition results from three or more captured images. When an image recognition result is obtained from three or more captured images, the final recognition result may be determined by a majority vote of the recognition result.

Further, in present embodiment, since the contour coordinate is calculated, even when a plurality of objects are reflected in the captured images, it is possible to perform the recognizing process for each object. For example, the object can be recognized individually in the first captured image and the subsequent second captured image.

In present embodiment, the contour coordinates are calculated, but the same object may be determined using the upper left coordinates of the object detecting area images. Compared to the case of determining whether or not the object is the same using the contour coordinates, the use of only the upper left coordinates of the object detection area makes it possible to further speed up the processing because the coordinate calculation processing and the holding information are small.

Third Embodiment

Figure 14:
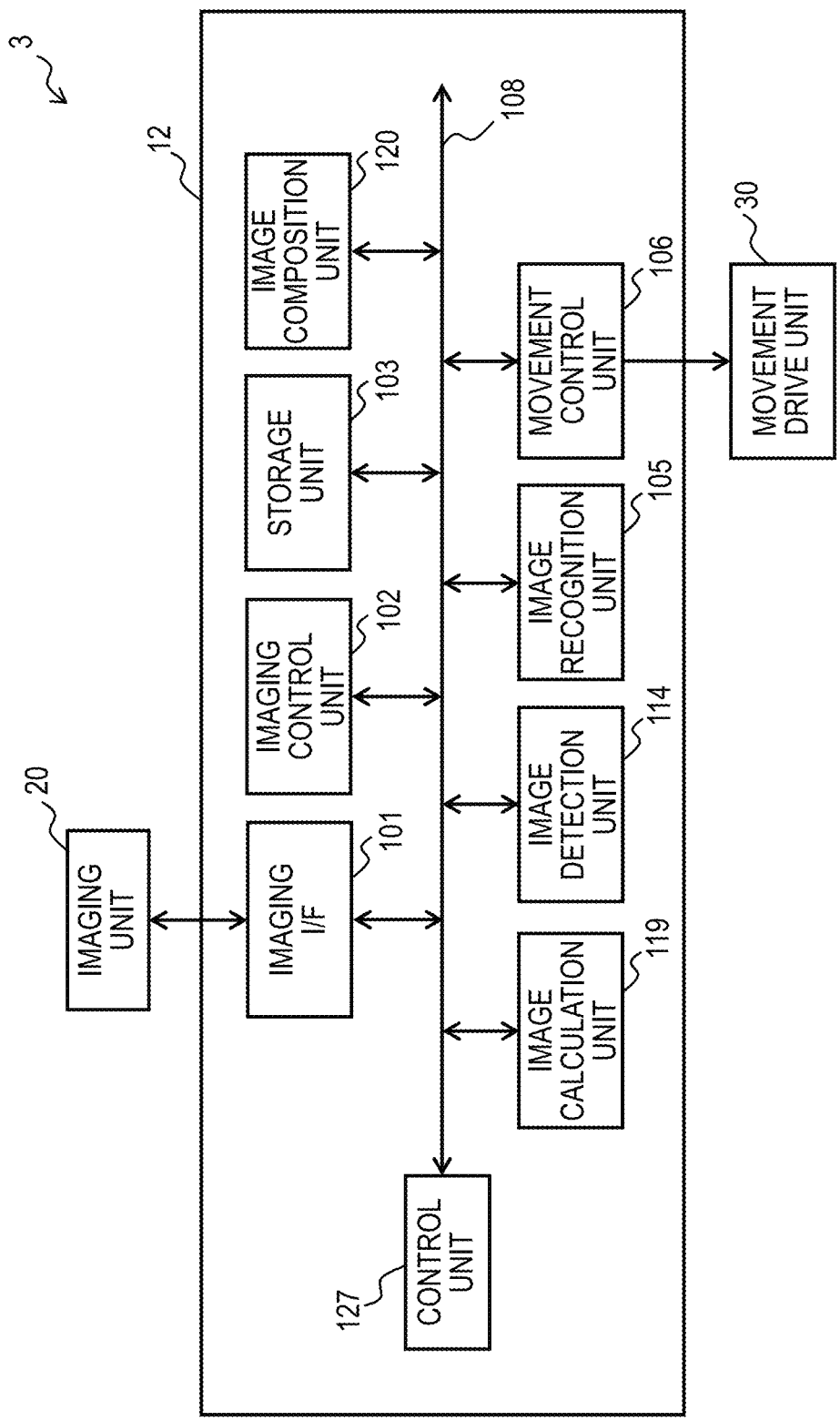
FIG. 14 is a block diagram showing the configuration of a mobile apparatus according to a third embodiment.

Next, third embodiment is explained. FIG. 14 is a diagram showing the mobile apparatus 3 according to the present embodiment, and the configuration other than semiconductor device 12 may be the same as that shown in FIG. 1. Therefore, the description thereof is omitted here. In addition, since the configuration of the semiconductor device 12 according to the present third embodiment shown in FIG. 14 is the same as those of semiconductor device 11 according to the second embodiment except for the image composition unit 120 and the control unit 127, descriptions thereof are omitted.

As shown in FIG. 14, the image composition unit 120 is coupled to the elements constituting semiconductor device 12 via a system bus. When the control unit 127 determines that the first and second objects which respectively are reflected in the first and second captured images continuously captured are the same object, the image composition unit 120 reads out the first and second object detection area images in the captured images from the storage unit 103 and composites the first and second object detection area images. The composited image is stored in the storage unit 103 as a composited image. The image composition unit 120 may perform image correction in order to adjust the size of each object detection area image in performing image composition.

The control unit 127 reads out the composited image from the storage unit 103, and instructs the image recognition unit 105 to perform image recognition processing on the composited image.

Figure 15:
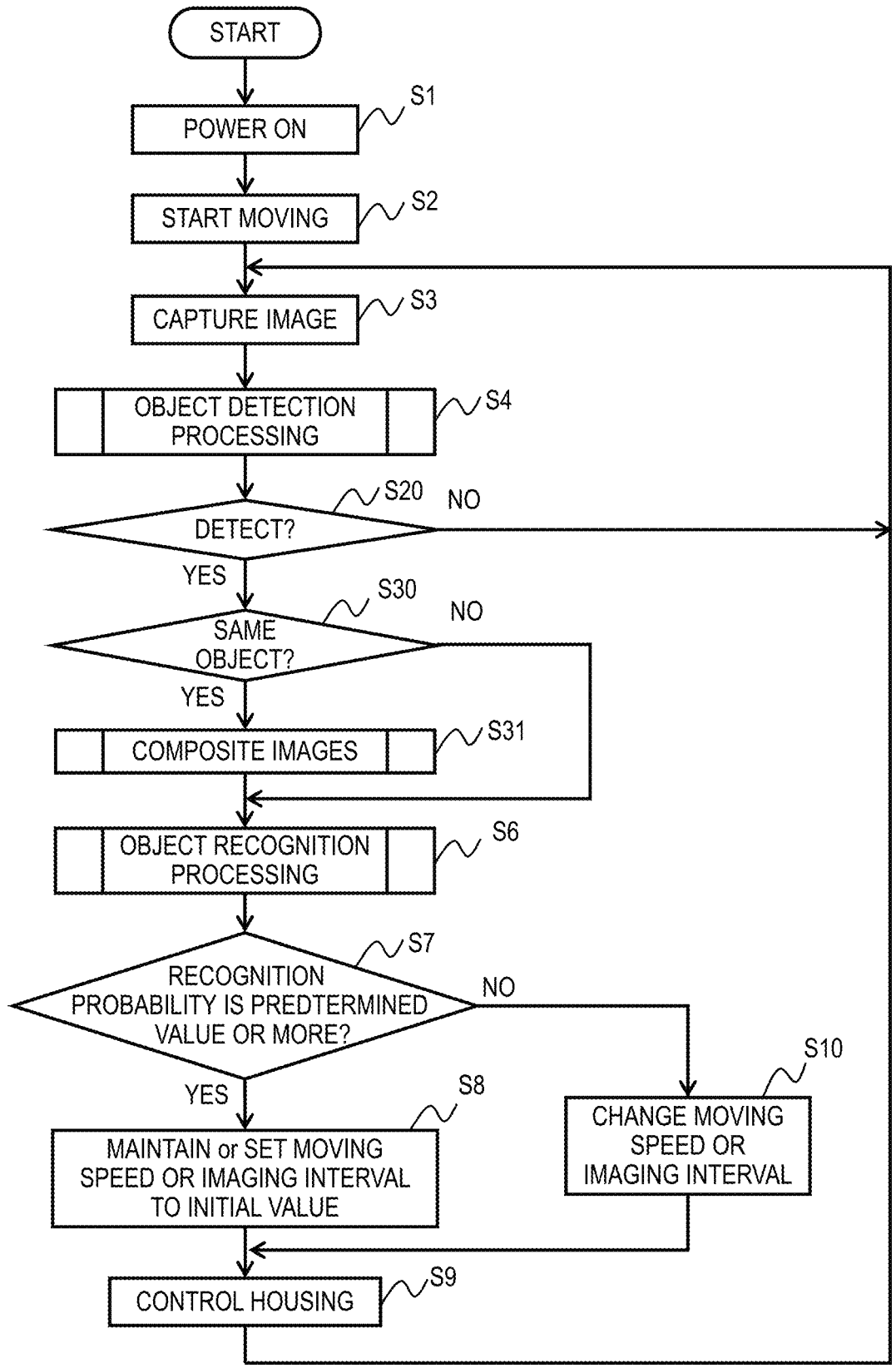
FIG. 15 is a flowchart illustrating an exemplary operation of the mobile apparatus according to the third embodiment.
Figure 16:
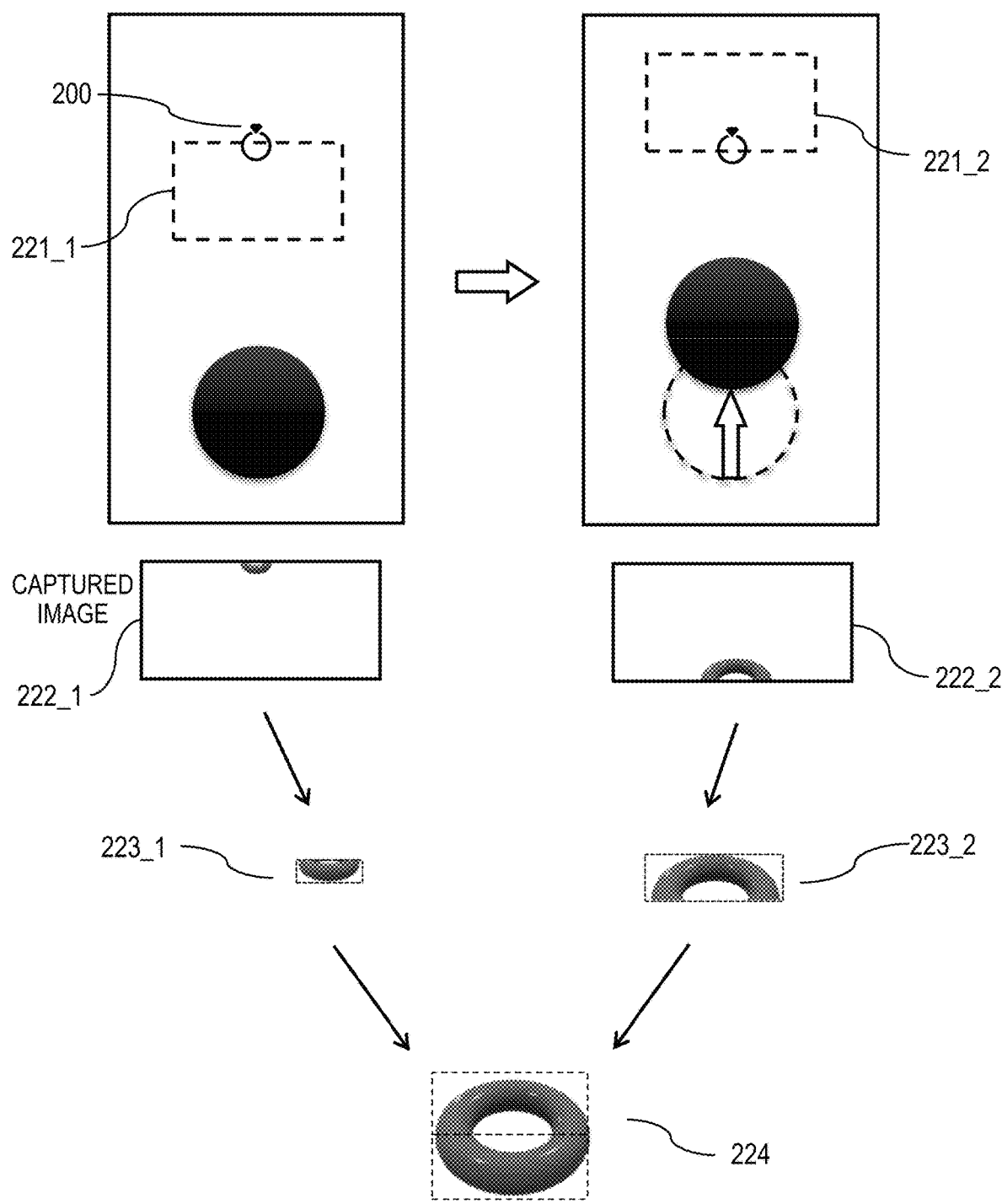
FIG. 16 is a diagram explaining an exemplary operation procedure of the mobile apparatus according to the third embodiment.

FIG. 15 is a flowchart showing an exemplary control process of the mobile apparatus 3 according to third embodiment. FIG. 16 is an explanatory diagram showing an operation of the control process of the mobile apparatus 3 according to third embodiment. In the right side of FIG. 16, reference numerals of portions common to those in the left side of FIG. 16 are omitted.

In the present third embodiment, the mobile apparatus 3 executes the process according to the following procedures after capturing images.

In step S20 of FIG. 15, image detection processing of the captured image by the image detection unit 114 is executed, and it is determined whether or not an object has been detected. When the object is detected (Yes in step S20), the image detection unit 114 cuts out a area in which the object is reflected in the captured image, and finds out contour coordinates of the object in the captured image. Further, the image calculation unit 119 estimates the contour coordinates of the object detected in the next captured image based on the contour coordinates. If no object is detected (No in step S20), the process returns to step S3 to capture an image.

In step S30, the control unit 127 compares the contour coordinates of the object in the captured image with the estimated contour coordinates estimated by the image calculation unit 119, and determines whether or not the object in the captured image is the same object as the object in the previous captured image.

When it is determined that the object is not the same object (No in step S30), the image recognition unit 105 performs image recognition processing on the object detection area image extracted this time, and outputs recognition probabilities (step S5). On the other hand, when it is determined that the object is the same (Yes in step S30), the image composition unit 120 composites the object detection area image extracted previously, and the object detection area image extracted this time (step S31). In step S5, the image recognition unit 105 performs image recognition processing on the composited image and outputs recognition probabilities.

When the object reflected in the captured image 222_2 shown in the right side of FIG. 16 is the same object as the object 200 reflected in the imaging image 222_1 captured previously, the object detection area image 223_1, 223_2 are composited to obtain a composite image 224. Then, the image recognition unit 105 performs image recognition processing on the composite image 224.

In step S6, the control unit 127 determines whether the recognition probability is equal to or greater than a predetermined value. If the recognition probability is equal to or greater than the predetermined value (Yes in step S6), the control unit 127 maintains or resets the moving speed and the imaging interval to the initial value (step S7), and controls the mobile apparatus 3 based on the recognition result (step S8). On the other hand, when the recognition probability is less than the predetermined value (No in step S6), the control unit 127 changes at least one of the moving speed and the imaging interval (step S10), and returns to step S3.

The control of the mobile apparatus 3 in step S8 in present embodiment may be the same as that in first embodiment, and therefore the explanation thereof is omitted.

According to present embodiment, as shown in the left side and the right side of FIG. 16, even when only a part of the object is reflected in the captured image, the entire image of the object can be obtained by image composition. Therefore, the result of the image recognition processing on the composite image is higher than the result of the image recognition processing on the captured image in which only a part of the object is reflected. Therefore, it is possible to improve the recognition accuracy.

In the above-described embodiment, the image detection unit, the image recognition unit, and the control unit of the mobile apparatus may be configured as hardware by logical circuits formed on an integrated circuit (IC chip), or may be realized by software using CPU as follows.

When implemented by software, the mobile apparatus includes a central processing unit (CPU) for executing instructions of a control program for implementing each function, a read-only memory (Read Only Memory) for storing the program, a random access memory (Random Access Memory) for expanding the program, and a storage device for storing the program and various data. The present invention can also be realized by supplying a storage medium in which the program code of the control program of the move device 1, which is software for realizing the above-described functions, is stored so as to be readable by a computer, to the mobile unit device, and reading out and executing the program code recorded in the recording medium by the computer.

The invention made by the present inventor has been described above based on the embodiment, but the present invention is not limited to the above embodiment, and it is needless to say that various modifications can be made without departing from the gist thereof.

What is claimed is:

1. A semiconductor device for an apparatus equipped with a wheel and a camera, the semiconductor device comprising:
   an image detection circuit configured to detect an object in a captured image and to cut out an image area including the object from the captured image as an object detection area image;
   an image recognition circuit configured to perform an image recognition processing for the object detection area image to output a recognition probability of the object; and
   a control circuit configured to set a moving speed of the wheel and an imaging interval of the camera,
   wherein the control circuit controls at least one of the moving speed and the imaging interval according to the recognition probability, and
   wherein the image detection circuit converts the captured image into a grayscale image, performs noise removal on a reduced image of the grayscale image, detects a contour of the object from the reduced image of the grayscale image after the noise removal, and cuts out the object detection area image from the captured image based on circumscribed rectangle information of the detected contour.

2. The semiconductor device according to claim 1, wherein the control circuit has an initial value of the moving speed, sets the moving speed to the initial value of the moving speed when the recognition probability is equal to or greater than a predetermined value, and sets the moving speed to be less than the initial value of the moving speed when the recognition probability is less than the predetermined value.

3. The semiconductor device according to claim 1, wherein the control circuit has an initial value of the imaging interval, sets the imaging interval to the initial value of the imaging interval when the recognition probability is equal to or greater than a predetermined value, and sets the imaging interval to be shorter than the initial value of the imaging interval.

4. The semiconductor device according to claim 1, wherein the image recognition circuit performs the image recognition processing to the object detection area image when a size of the object detection area image is larger than a predetermined size.

5. The semiconductor device according to claim 1, wherein, when a plurality of contours are detected from the reduced image of the grayscale image, the image detection circuit generates a connected circumscribed rectangle in which a plurality of circumscribed rectangles corresponding to the plurality of contours are connected based on circumscribed rectangle information of the plurality of the contours, and cuts out the object detection area image from the captured image based on information of the connected circumscribed rectangle.

6. The semiconductor device according to claim 1, wherein, when a plurality of contours are detected from the reduced image of the grayscale image, the image detection circuit calculates priorities for a plurality of circumscribed rectangles corresponding to the plurality of contours, selects one of the circumscribed rectangles based on the priorities, and cuts out the object detection area image from the captured image based on circumscribed rectangle information corresponding to selected circumscribed rectangle.

7. The semiconductor device according to claim 1, wherein the image recognition circuit performs the image recognition processing using a neural network.

8. A mobile apparatus comprising:
a camera that captures an image;
a wheel coupled with a motor that moves the mobile apparatus;
an image detection circuit that 1) detects an object in the captured image and cutting out an object detection area image including the object and 2) outputs a contour coordinates of the object included in the captured image;
an image recognition circuit that performs an image recognition processing to the object detection area image and outputs a recognition probability of the object; and
a control circuit that controls at least one of the camera and the wheel based on the recognition probability,
wherein the control circuit outputs a recognition result of the object based on a first recognition result and a second recognition result,
wherein the first recognition result is obtained based on a first recognition probability for a first object included in a first captured image,
wherein the second recognition result is obtained based on a second recognition probability for a second object included in a second captured image, and
wherein the control circuit 1) compares a first contour coordinates of the first object included in the first captured image with a second contour coordinates of the second object included in the second captured image, and 2) outputs the recognition result based on the first recognition result and the second recognition result based on determining that the first object and the second object are identical.

9. The mobile apparatus according to claim 8, wherein the control circuit controls the wheel to change a moving direction of the mobile apparatus, when the recognition probability is equal to or greater than a predetermined value, and
wherein the control circuit controls the wheel to change a moving speed of the mobile apparatus, when the recognition probability is less than the predetermined value.

10. The mobile apparatus according to claim 8, further comprising:
a central processing unit (CPU); and
a memory storing instructions, when executed by the CPU, causes the CPU to notify a an existence of the object, when the recognition probability is equal to or greater than a predetermined value.

11. A method of controlling a mobile apparatus comprising:
capturing a first image and a second image using a camera;
detecting a first object in the captured first image and a second object in the captured second image;
detecting a first contour coordinate of the first image in the captured first image and a second contour coordinate of the second image in the captured second image;
cutting out a first object detection area image including the first object from the captured first image and a second object detection area image including the second object from the captured second image;
generating a composite image composing the first object detection area image cut out from the captured first image with the second object detection area image cut out from the captured second image based on determining that the first object included in the captured first image and the second object included in the captured second image are identical
performing an image recognition processing on the composite image to output a recognition probability of the first object; and
controlling at least one of a moving speed of the mobile apparatus and an imaging interval of the camera based on the recognition probability.

12. The method according to claim 11, further comprising:
determining whether a first size of the first object detection area image is larger than a predetermined size and whether a second size of the second object detection area image is larger than the predetermined size.

* * * * *